(12) United States Patent
Li et al.

(10) Patent No.: US 6,437,051 B2
(45) Date of Patent: Aug. 20, 2002

(54) GRAFT COPOLYMER OF SYNDIOTACTIC STYRENE COPOLYMER

(75) Inventors: Chi-Lan Li; Jing-Cherng Tsai; Joung-Yei Chen; Wee-Pin Chao; Bor-Ping Wang; In-Mau Chen; Huai-Mei Chou, all of Hsinchu (TW)

(73) Assignee: Industrial Technology Research Institute, Hsin-Chu (TW)

( * ) Notice: Subject to any disclaimer, the term of this patent is extended or adjusted under 35 U.S.C. 154(b) by 0 days.

(21) Appl. No.: 09/750,048

(22) Filed: Dec. 29, 2000

Related U.S. Application Data

(63) Continuation-in-part of application No. 09/211,049, filed on Dec. 15, 1998, now abandoned.

(30) Foreign Application Priority Data

Jun. 23, 1998 (TW) ........................................ 87110125 A

(51) Int. Cl.$^7$ .......................... C08F 12/08; C08F 212/06
(52) U.S. Cl. ................... 525/333.3; 525/333.4; 525/333.5; 525/333.6; 525/379; 525/386; 526/347; 526/293; 526/329.2
(58) Field of Search ............................ 525/333.4, 333.3, 525/63; 526/347, 293, 329.3, 340

(56) References Cited

U.S. PATENT DOCUMENTS

| | | | |
|---|---|---|---|
| 5,250,629 A | 10/1993 | Tani et al. | |
| 5,508,353 A | 4/1996 | Liu et al. | |
| 5,990,256 A | 11/1999 | Newmann | |
| 6,015,862 A | * 1/2000 | Chung et al. | ................. 525/320 |

FOREIGN PATENT DOCUMENTS

WO    WO 91/07451    5/1991

* cited by examiner

Primary Examiner—James J. Seidleck
Assistant Examiner—Olga Asinovsky
(74) Attorney, Agent, or Firm—Sughrue Mion, PLLC

(57) ABSTRACT

The present invention provides a graft copolymer of a syndiotactic styrene/para-alkylstyrene copolymer, having the formula of

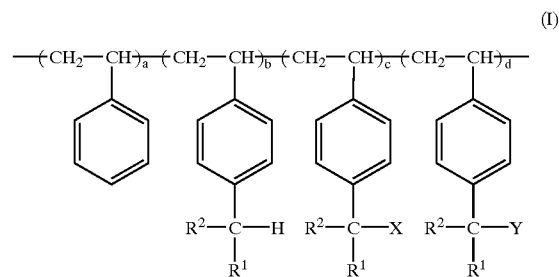

(I)

wherein $R^1$ and $R^2$ are independently selected from the group consisting of hydrogen, alkyl, and primary and secondary haloalkyl; X is a functional group selected from a group containing halogen, oxygen, sulfur, silicon, nitrogen, carbon, phosphorus, and mixtures thereof; Y is an atactic polymer moiety; a ranges from 10 to 30000; b ranges from 0 to 30000; c ranges from 0 to 30000; and d ranges from 1 to 30000. The compatibility of the graft copolymer of syndiotactic styrene/para-alkylstyrene copolymer of the present invention with other polymers is improved over a syndiotactic styrene polymer. Also, the graft copolymer of the present invention can serve as a compatibilizer for a polymer blend.

18 Claims, No Drawings

GRAFT COPOLYMER OF SYNDIOTACTIC STYRENE COPOLYMER

This is a Continuation-In-Part of application Ser. No. 09/211,049 filed Dec. 15, 1998 abandoned.

BACKGROUND OF THE INVENTION

1. Field of the Invention

The present invention relates to a graft copolymer of a syndiotactic styrene/para-alkylstyrene copolymer.

2. Description of the Prior Art

Syndiotactic polystyrene (sPS) is very useful in many commercial applications. However, it suffers from a major deficiency: poor adhesion to other materials (for example, to the copper of PC boards). In addition, sPS has poor compatibility with other functional polymers. Therefore, there is a need to improve the physical properties of the conventional syndiotactic polystyrene.

Chung et al. in U.S. Pat. No. 5,543,484 have disclosed a functionalized x-olefin/para-alkylstyrene copolymer. First, (α-olefin and para-alkylstyrene are copolymerized. The incorporation of p-alkylstyrene into the α-olefin polymer results in the generation of benzylic protons, which are readily available for many chemical reactions, thereby introducing functional groups at the benzylic position under mild reaction conditions. Then, the olefin/p-alkylstyrene copolymer is functionalized by the functionalization of benzylic protons in p-alkylstyrene units. Such functionalization leads to improvement in the physical properties of the original olefin polymers.

Powers et al. in U.S. Pat. No. 5,548,029 has disclosed graft copolymers of para-alkylstyrene/isoolefin. In a similar manner, isoolefin and para-alkylstyrene are copolymerized, and then the p-alkylstyrene/isoolefin copolymer is functionalized by the functionalization of benzylic protons in p-alkylstyrene units. By such functionalization, the physical properties of the isoolefin polymer can be improved.

In Powers et al., to improve compatibility of the isoolefin/p-alkylstyrene copolymer with other polymers (for example, with thermoplastic polymers), grafting technique can also be used. That is, a thermoplastic polymer moiety is grafted onto the functional copolymer. Moreover, such a graft copolymer can also serve as a compatibilizer to compatibilize polymer blends.

To date, no one has ever provided a graft copolymer of syndiotactic styrene/para-alkylstyrene copolymers.

SUMMARY OF THE INVENTION

The object of the present invention is to solve the above-mentioned problems and to provide a graft copolymer of a syndiotactic styrene/para-alkylstyrene copolymer. The compatibility of the graft copolymer of syndiotactic styrene/para-alkylstyrene copolymer of the present invention with other polymers is improved over a syndiotactic styrene polymer. Moreover, the graft copolymer of a syndiotactic styrene/para-alkylstyrene copolymer of the present invention can serve as a compatibilizer for a polymer blend so as to improve the compatibility of the polymer blend with other polymers, and increase the impact resistance and elongation of the polymer blend, while the physical properties of the original polymers in the polymer blend can still be maintained.

To achieve the above-mentioned object, the graft copolymer of a syndiotactic styrene/para-alkylstyrene copolymer of the present invention has the formula of

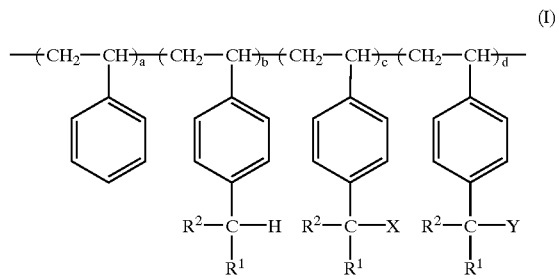

(I)

wherein $R^1$ and $R^2$ are independently selected from the group consisting of hydrogen, alkyl, and primary and secondary haloalkyl, X is a functional group selected from a group containing halogen, oxygen, sulfur, silicon, nitrogen, carbon, phosphorus, and mixtures thereof, Y is an atactic polymer moiety, a ranges from 10 to 30000, b ranges from 0 to 30000, c ranges from 0 to 30000, and d ranges from 1 to 30000.

DETAILED DESCRIPTION OF THE INVENTION

The present invention is the first time a graft-from copolymer of a syndiotactic styrene/para-alkylstyrene copolymer has been successfully provided.

The graft-from copolymer of a syndiotactic styrene/para-alkylstyrene copolymer has the formula of

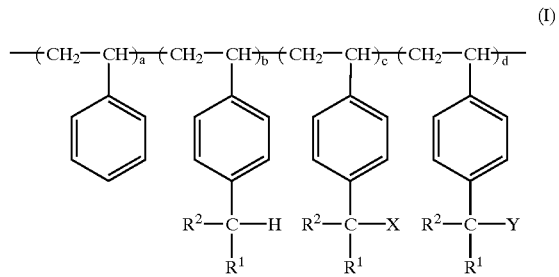

(I)

wherein $R^1$ and $R^2$ are independently selected from the group consisting of hydrogen, alkyl, and primary and secondary haloalkyl.

X is a functional group selected from a group containing halogen, oxygen, sulfur, silicon, nitrogen, carbon, phosphorus, and mixtures thereof. Preferably, $R^1$ and $R^2$ are independently selected from the group consisting of hydrogen, $C_1$ to $C_5$ alkyl, and $C_1$ to $C_5$ primary and secondary haloalkyl.

Y is an atactic polymer moiety.

a ranges from 10 to 30000, b ranges from 0 to 30000, c ranges from 0 to 30000, and d ranges from 1 to 30000.

Preferably, the copolymer has a number average molecular weight of at least 1000.

The general process for preparing the graft copolymer of a syndiotactic styrene/para-alkylstyrene copolymer of the present invention will be described below.

The grafting techniques can be classified into "graft-from" and "graft-on". Graft-from technique involves the reaction of a syndiotactic styrene/p-alkylstyrene copolymer and a monomer via anionic polymerization, cationic polymerization, anionic or cationic ring-open polymerization, or free radical polymerization. A "graft-from" anionic polymerization is as follows:

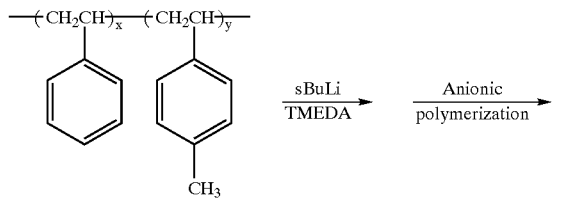

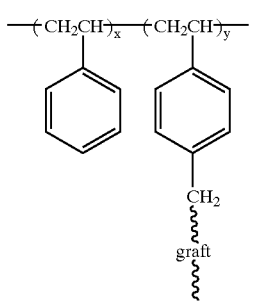

The reaction of a functionalized (such as brominated) syndiotactic styrene/p-alkylstyrene with a monomer via cationic polymerization is as follows:

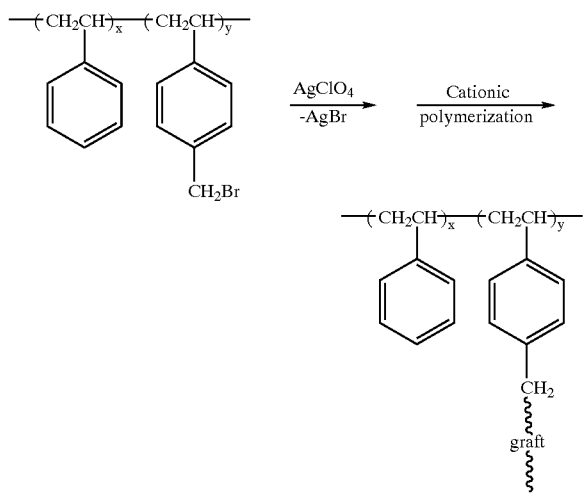

The reaction of a functionalized (such as brominated) syndiotactic styrene/p-alkylstyrene with a monomer via free radical polymerization is as follows:

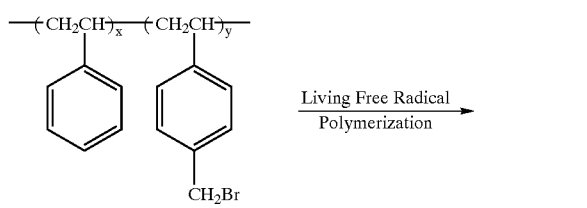

-continued

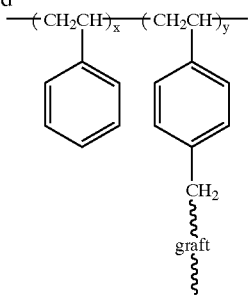

The "graft-on" technique involves the reaction of a functionalized syndiotactic styrene/p-alkylstyrene copolymer and a polymer which can react with the functional group of such a functionalized syndiotactic styrene/p-alkylstyrene copolymer, such that the polymer bonds to the functionalized syndiotactic styrene/p-alkylstyrene copolymer and grafting is achieved.

Therefore, Y in formula (I) is selected from the group consisting of polymers and copolymers of anionically polymerizable monomers, cationically polymerizable monomers, anionically and cationically ring-openable monomers, and free radical polymerizable monomers.

Representative examples of the anionically polymerizable monomers include conjugated dienes, vinyl aromatic compounds, vinyl unsaturated amides, acenaphthylene, 9-acrylcarbazole, acrylonitrile, methacrylonitrile, organic isocyanates, acrylates, methacrylates, alkyl acrylates, alkyl methacrylates, glycidyl methacrylates, vinyl pyridines, and mixtures thereof.

Representative examples of the cationically polymerizable monomers include vinyl aromatic compounds, vinyl ethers, N-vinylcarbazole, isobutene, and mixtures thereof.

Representative examples of the ring-openable monomers include cyclic ethers, sulfides, lactones, lactams, N-carboxyanhydrides, cyclic anhydrides, and mixtures thereof.

Representative examples of the free radical polymerizable monomers include vinyl aromatic compounds, conjugated dienes, acrylates, methacrylates, alkyl acrylates, alkyl methacrylates, vinyl acetates, and mixtures thereof.

As a result, after further grafting (e.g., graft-from or graft-on), the syndiotactic styrene/para-alkylstryene copolymer of the present invention has a grafted side chain (Y) that is an atactic polymer, rather than a syndiotatic polymer.

The general process for preparing the functionalized syndiotactic styrene/para-alkylstyrene copolymer of the present invention will be described below.

We take the reaction of styrene and para-methylstyrene monomers as an example. First, the two monomers are copolymerized by using a metallocene as a catalyst. The catalyst system may also include an activating cocatalyst such as methyl aluminoxane (MAO).

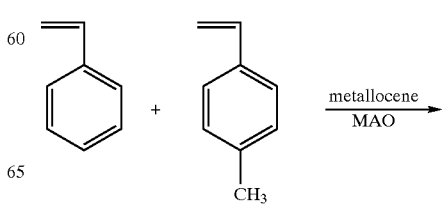

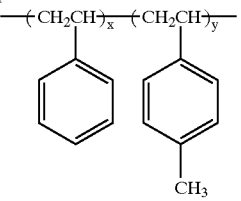

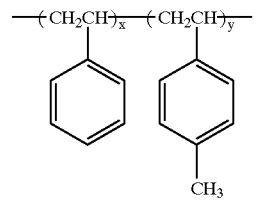

wherein each x and y is the molar ratio of the respective monomer and x+y=100.

Suitable metallocene catalysts have a delocalized π-bonded moiety with a constrained geometry. The catalysts may be further described as a metal coordination complex comprising a metal of Groups IVB–VIB of the Periodic Table of the elements and a delocalized π-bonded moiety with a constrained geometry. Some of them have been taught in U.S. Pat. Nos. 4,542,199; 4,530,914; 4,665,047; 4,752,597; 5,026,798; and 5,272,236. Preferred catalyst complexes include zirconocene and titanocene coordination compounds with single or double cyclopentadienyl derivatives which form the constrained ligand geometry.

The activating cocatalyst can be methyl aluminoxane (MAO), a trialkyl aluminum, a dialkyl aluminum, a salt of an inert and non-coordinating anion, or a mixture thereof.

The trialkyl aluminum can be selected from the group consisting of trimethyl aluminum, triethyl aluminum, tripropyl aluminum, trisopropyl aluminum, tributyl aluminum, and truisobutyl aluminum (TIBA).

The inert and non-coordinating anion can be a borate. Borates that are suitable for use in the present invention include N,N-dimethyl anilinium tetrakis(pentafluorophenyl) borate, triphenyl carbenium tetrakis(pentafluorophenyl) borate, trimethyl ammonium tetrakis(pentafluorophenyl) borate, ferrocenium tetrakis(pentafluorophenyl)borate, dimethyl ferrocenium tetrakis(pentafluorophenyl)borate, and silver tetrakis(pentafluorophenyl)borate.

Preferably, the activating cocatalyst is methyl aluminoxane, or a mixture of a trialkyl aluminum and a borate.

Suitable diluents for the monomers, catalyst components and polymeric reaction products include the general group of aliphatic and aromatic hydrocarbons, used singly or in a mixture, such as propane, butane, pentane, cyclopentane, hexane, toluene, heptane, isooctane, etc.

In general, the polymerization reaction of the present invention is carried out by mixing styrene and p-methylstyrene in the presence of the catalyst and diluent in a copolymerization reactor, with thorough mixing at a temperature between 0° C. to 100° C. The polymerization may be carried out in an inert gas atmosphere and the substantial absence of moisture.

The advantage of the styrene/p-methylstyrene is that the benzylic protons in the p-methylstyrene unit can be easily converted to various functional groups, such as —COOH, —OH, —NH₂, —Cl, —Br, —M, COOM (M=metal, e.g. Li, Na, K and Ca), under mild reaction conditions. Most functionalization reactions of benzylic protons in organic compounds can be applied to those of benzylic protons in p-methylstyrene.

The following equations, involving (but not limited to) bromination and carboxylation reactions of the syndiotactic styrene/p-methylstyrene copolymer are used to illustrate the functionalization reactions of benzylic protons in the syndiotactic styrene/p-methylstyrene copolymer.

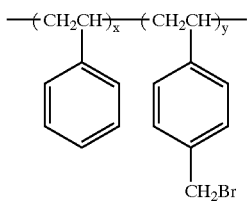

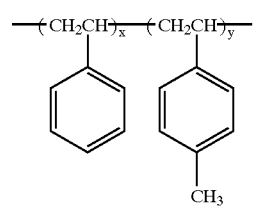

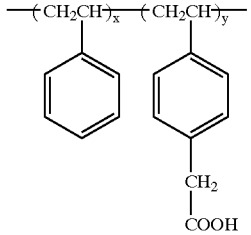

Among the functionalization reactions of the benzylic protons in the syndiotactic styrene/p-alkylstyrene copolymer, halogenation and metallation are the most important. The halogenation reaction results in a benzylic halogen, which constitutes a very active electrophile that can be converted to various functionalities via nucleophilic substitution reactions. The metallation reaction results in a benzylic anion in the p-alkylstyrene unit, which can be converted to many other functionalities. In fact, halogenated and metallated syndiotactic styrene/p-alkylstyrene copolymers significantly broaden the scope of achievable function groups to include almost all the desirable organic functional groups.

Therefore, via the direct reaction of the unfunctionalized syndiotactic styrene/p-alkylstyrene, or via the reaction of the halogenated or metallated syndiotactic styrene/p-alkylstyrene, the functional group X on formula (I) may be a group containing halogen, metal, oxygen, sulfur, silicon, nitrogen, carbon, phosphorus, or combinations thereof. The functional groups X on the benzylic position have been taught in U.S. Pat. Nos. 5,543,484 (Chung, et al.); 5,548,029 (Powers et al.); and 5,162,445 (Powers, et al.)

Representative examples of the functional group X containing a metal include alkali and alkaline earth metals.

Examples of the functional group X containing oxygen, which results in attachment of —O— to the benzylic position from which the halide ion is displaced, include alkoxides, phenoxides and carboxylates.

Examples of the functional group X containing sulfur, which results in attachment of —S— to the benzylic position from which the halide ion is displaced, include thiolates, thiophenolates, thioethers, thiocarboxylates, dithiocarboxylates, thioureas, dithiocarbamates, xanthates and thiocyanates.

Examples of the functional group X containing silicon, which results in attachment of —Si— to the benzylic position from which the halide ion is displaced, include silanes and halosilanes.

Examples of the functional group X containing carbon, which results in attachment of —C— to the benzylic position from which the halide ion is displaced, include malonates, cyanides, and $CR^3_3$ wherein each $R^3$ is an organic group.

Examples of the functional group X containing nitrogen, which results in attachment of —N— to the benzylic position from which the halide ion is displaced, include amides, amines, carbazoles, phthalimides, pyridine, maleimide and cyanates.

Examples of the functional group X containing phosphorus, which results in attachment of —P— to the benzylic position from which the halide ion is displaced, include phosphines.

The following examples are intended to illustrate the process and advantages of the present invention more fully without limiting its scope, since numerous modifications and variations will be apparent to those skilled in the art.

Synthesis of Syndiotactic Poly(styrene-co-p-alkylstyrene)

EXAMPLE 1

Synthesis of Syndiotactic Poly(styrene-co-p-methylstyrene)

35 mL of the purified para-methylstyrene monomer (hereinafter referred to as "pMS") and 315 mL of the purified styrene monomer (hereinafter referred to as "SM") were charged in 1 L metal reaction vessel under nitrogen. Then, 2.8 mL of 10 wt % methyl aluminoxane (MAO) was charged in the reaction vessel. The reaction vessel was heated to 70° C., then, 0.0208 mmol of pentamethylcyclopentadienyl dimethoxy titanium (III) [CP*Ti(OMe)$_2$] was added. The reaction proceeded for 60 minutes and was terminated by adding a sodium hydroxide/methanol solution. The copolymer was isolated by the Soxhlet extraction method with methanol for 24 hours. The product was 86 g. The composition, melting point, and molecular weight of the copolymer were determined by $^1$H NMR, differential scanning calorimetry (DSC), and gel permeation chromatography (GPC), respectively. The copolymer contained about 12 mol% of pMS. The melting point was 239° C. GPC results indicated a weight average molecular weight (Mw) of 1,526,000, a number average molecular weight (Mn) of 741,000, and a molecular weight distribution of 2.06. The other properties of the resulting copolymer are set forth in Table 1.

EXAMPLE 2

The procedures as described in Example 1 were employed except that the amounts of the catalyst and MAO added were changed. The results are shown in Table 1.

EXAMPLE 3

The procedures as described in Example 1 were employed except that the pentamethylcyclopentadienyl dimethoxy titanium (III) [Cp*Ti(OMe)$_2$] catalyst was replaced by the catalyst system used in U.S. Pat. No. 5,644,009. The results are shown in Table 1.

EXAMPLES 4–6

The procedures as described in Example 3 were employed except that the reaction was conducted in a 1 L glass reaction vessel, and a hydrogen gas with a pressure of 0.1 kg/cm$^2$G was introduced into the vessel. The results are shown in Table 1.

EXAMPLE 7

The procedures as described in Example 1 were employed except that the reaction was conducted in a 100 L reaction vessel, and the amount of the reactants was changed. The results are shown in Table 1.

EXAMPLE 8

The procedures as described in Example 1 were employed except that a hydrogen gas with a pressure of 0.4 kg/cm$^2$G was introduced into the vessel. The results are shown in Table 1.

TABLE 1

| Example | SM | pMS | Catalyst (mmol) | MAO (ml) | Reaction Time (min) | Melting Point (° C.) | Mw | Mw/Mn | pMS content in the copolymer (mol %) |
|---|---|---|---|---|---|---|---|---|---|
| 1 | 315 ml | 35 ml | 0.0208 | 2.8 | 60 | 239 | $1.53 \times 10^6$ | 2.06 | 12 |
| 2 | 315 ml | 35 ml | 0.0384 | 6.2 | 60 | 232 | $3.4 \times 10^5$ | 1.87 | 17 |
| 3 | 295 ml | 5 ml | 0.019 | 3.2 | 270 | 259 | $1.2 \times 10^5$ | 6.1 | 5 |
| 4 | 397 ml | 3 ml | 0.0208 | 8.4 | 30 | 271 | $7.8 \times 10^5$ | 1.68 | 1 |
| 5 | 315 ml | 35 ml | 0.0384 | 6.2 | 40 | 236 | $2.4 \times 10^5$ | 9.32 | 15 |
| 6 | 200 ml | 200 ml | 0.0416 | 9.0 | 300 | — | $1.12 \times 10^5$ | 2.93 | 58 |
| 7 | 45 L | 5 L | 1.8 | 500 | 120 | 235 | $9.4 \times 10^5$ | 2.04 | 7 |
| 8* | 300 ml | 33 ml | 0.008 | 1.5 | 30 | 242.8 | $1.57 \times 10^5$ | 2.4 | 10 |

*1.5 mL of 22 wt % TIBA was used

Functionalization of Syndiotactic Poly(styrene-co-p-alkystyrene)

EXAMPLE 9

Oxidation of Syndiotactic Poly(styrene-co-p-methylstyrene) (sPS-pMS)

20 g of the syndiotactic poly(styrene-co-p-methylstyrene) (sPS-pMS) obtained from Example 2 was dissolved in 600 mL of o-dichlorobenzene (ODCB) under an oil bath at 120° C. 300 mL of acetic acid was gradually added into the solution and the reaction mixture was cooled to about 100° C. After that, 20 mole % of cobalt (III) acetate tetrahydrate and 60 mole % of sodium bromide, based on the pMS content of sPS-pMS, were added, and oxygen was bubbled through at a rate of 1 L/min for 2 hours. After cooling, the reaction was terminated with methanol, filtered, washed with a hot water/methanol mixture twice, washed with methanol twice, and extracted with methanol by the Soxhlet extraction method for 20 hours. Both —CHO and —COOH groups were observed by $^1$H NMR spectrum. The results are shown in Table 2. Total oxidation indicates the mole % of the oxidized functional group based on the moles of the original polymer (sPS-pMS). PDI refers to the polydispersity index.

EXAMPLES 10 and 11

The same procedures described in Example 9 were employed, except that the amounts of the catalyst and sodium bromide added were changed, and the reaction time was changed. The results are shown in Table 2.

EXAMPLES 12 and 13

The same procedures described in Example 9 were employed except that 20 g of syndiotatic poly(styrene-co-p-methylstyrene) obtained from Example 7 was used, and the reaction time was changed to control molecular weight. The results are shown in Table 2.

TABLE 2

| Example | Reaction Time | Co:NaBr (mole % of pMS) | Total oxidation (%) | Mn | PDI | Tm (° C.) | Tg (° C.) |
|---|---|---|---|---|---|---|---|
| 9 | 2 hr | 20:60 | 9.27 | 16000 | 2.29 | 185.28 | 98.74 |
| 10 | 1 hr 50 m | 10:40 | 3.61 | 45000 | 2.28 | 225.82 | 96.92 |
| 11 | 1.5 hr | 10:40 | 3.32 | 58000 | 1.98 | 223.45 | 95.26 |
| 12 | 3.0 hr | 20:40 | 6.20 | 43000 | 1.76 | 228.0 | 93.67 |
| 13 | 1.5 hr | 20:40 | 6.15 | 289000 | 2.32 | 235.5 | 93.22 |

EXAMPLE 14

Bromination of Syndiotactic Poly(styrene-co-p-methylstyrene)

35.9 g of syndiotactic poly(styrene-co-p-methylstyrene) obtained from Example 6 was charged in a round bottom flask that was wrapped with aluminum foil. 450 mL of chloroform, 49.6 g of N-bromosuccinimide (NBS), and 1.7 g of benzoyl peroxide (BPO) were added, then the mixture was stirred in an oil bath under nitrogen for 43 hours. The polymer solution was precipitated by isopropanol, and then washed with water and isopropanol. The brominated polymer was dried under vacuum at 60° C. and 49.3 g was obtained. From $^1$H NMR spectrum, it was observed that 75% of the chemical shift of para—$CH_3$ was converted to 4.4 ppm, the chemical shift of —$CH_2Br$.

EXAMPLE 15

Bromination of Syndiotactic Poly(styrene-co-p-methylstyrene)

2.5 g of syndiotactic poly(styrene-co-p-methylstyrene) obtained from Example 2 was dissolved with 200 mL of $C_6H_5Cl$ in an oil bath at 120° C. to ensure complete dissolution. The solution was cooled to 75° C., and 1 mL of 10% bromine in $C_6H_5Cl$ under dark was added to the round bottom flask charged with the polymer solution over a period of 20 minutes. During the reaction, the flask was illuminated by a 90 W light bulb, and the bromine added was equal to 50% of the content of the para-$CH_3$. Subsequently, the polymer solution was precipitated by methanol, and then washed with water and methanol. The brominated polymer was dried under vacuum at 60° C. and 2.58 g was obtained. From the $^1$H NMR spectrum, it was observed that about 43% of the chemical shift of the para-$CH_3$ was converted to 4.4 ppm, the chemical shift of —$CH_2Br$.

EXAMPLE 16

Carboxylation of Syndiotactic Poly(styrene-co-p-methylstyrene)

3 g of dried syndiotactic poly(styrene-co-p-methylstyrene) obtained from Example 6 was added in 100 mL of purified and dried cyclohexane under nitrogen at 60° C. for dissolution. The polymer solution was cooled to 0° C., and a brownish red solution of 10.4 mL of s-BuLi (1.3 M) and 4.1 mL of tetramethylethylenediamine (TMEDA) was added. The reaction was conducted at 60° C. for 3 hours, and then cooled to room temperature. 150 mL of THF saturated by $CO_2$ was added, and the bubbling of $CO_2$ through the reaction mixture was continued for 1.5 hour for carboxylation. The reaction was terminated by methanol, and the carboxylated polymer was precipitated by methanol. The resulting polymer was re-dissolved with THF, precipitated by IPA (isopropyl alcohol) and then dried. FT-IR spectrum shows strong absorption of carboxyl group (C=O) at 1718 cm$^{-1}$. From the DSC curve, it was found that the glass transition temperature (Tg) was increased by 5.5° C.

EXAMPLE 17

Silylation of Syndiotactic Poly(styrene-co-p-methylstyrene)

0.5 g of the carboxylated polymer obtained from Example 15 was dissolved with 50 mL of THF. Then, 1 mL of $(CH_3)_3SiCl$ and 0.5 mL of $Et_3N$ were added, and stirred under heating for 30 minutes. The reaction solution was precipitated by methanol. The polymer was isolated by filtering, washing with methanol, and drying. From the $^1$H NMR spectrum, the chemical shift of the —$Si(CH_3)_3$ at 0.09 ppm was observed.

Preparation of Graft Copolymers

EXAMPLE 18

Preparation of Syndiotactic Poly(styrene-co-p-methylstyrene)-g-polystyrene (sPS-pMS-g-polystyrene)

1.04 g of syndiotactic poly(styrene-co-p-methylstyrene) (sPS-pMS) obtained from Example 8 (containing 10 mol% of syndiotactic polystyrene) was charged in a 300 ml round-bottom flask and dissolved with 150 mL of the purified and dried cyclohexane. Then, 30 mL of cyclohexane was removed by distillation. 1.5 mL of TMEDA (tetramethylethylene diamine) and 3.8 mL of sec-butyl lithium (1.3 M in cyclohexane) were mixed and then the dark brown solution was added to the sPS-pMS/cyclohexane solution. The mixed solution was continuously stirred at 35° C. for 20 hours. The round-bottom flask was moved into the glove box, and the reaction mixture was washed with n-pentane repeatedly, filtered, and dried under reduced pressure. 100 mL of n-pentane was added to the residue and the round-bottom flask was removed from the glove box. 10 mL of the purified styrene was added to the flask and stirred at room temperature for 30 minutes. A large quantity of methanol was added to terminate the reaction. The resulting polymer was filtered, collected, and extracted with methyl ethyl ketone (MEK) at room temperature. The soluble and insoluble polymer fractions were separated by centrifuge and dried under reduced pressure to afford 6.2 g of sPS-pMS-g-polystyrene (insoluble in MEK) and 3.3 g of homopolymer of styrene (soluble in MEK).

EXAMPLE 19

Preparation of Syndiotactic Poly(styrene-co-p-methylstyrene)-g-polybutadiene (sPS-pMS-g-polybutadiene)

2.0 g of syndiotactic poly(styrene-co-p-methylstyrene) (sPS-pMS) obtained from Example 3 (containing 5 mol % of syndiotactic polystyrene) was charged in a 300 ml round-bottom flask and dissolved with 150 mL of the purified and dried cyclohexane. Then, 50 mL of cyclohexane was removed by distillation. 1.5 mL of TMEDA and 3.8 mL of sec-butyl lithium (1.3 M in cyclohexane) were mixed and then the dark brown solution was added to the sPS-pMS/cyclohexane solution. The mixed solution was continuously stirred at 55° C. for 20 hours. The round-bottom flask was moved into the glove box, and the reaction mixture was washed with n-pentane repeatedly, filtered, and dried under reduced pressure. 100 mL of n-pentane was added to the residue and the round-bottom flask was removed from the glove box. 4.0 g of the purified 1,3-butadiene was added to the flask and stirred at room temperature for 6 hours. The reaction was terminated by methanol, and then a large quantity of methanol was added to precipitate the polymer. The resulting polymer was filtered, collected, and extracted with n-pentane at room temperature. The soluble and insoluble polymer fractions were separated by centrifuge and dried under reduced pressure to afford 3.08 g of sPS-pMS-g-polybutadiene (insoluble in n-pentane) and 1.83 g of homopolymer of butadiene (soluble in n-pentane). The $^1$H NMR analysis indicated that the sPS-pMS-g-polybutadiene contained 50.7 mol % of 1,3-butadiene.

EXAMPLE 20

Preparation of Syndiotactic Poly(styrene-co-p-methylstyrene)-g-polymethylmethyacrylate (sPS-pMS-g-PMMA)

2.0 g of syndiotactic poly(styrene-co-p-methylstyrene) (sPS-pMS) obtained from Example 3 (containing 5 mol % of syndiotactic polystyrene) was charged in a 300 ml round-bottom flask and dissolved with 150 mL of the purified and dried cyclohexane. Then, 50 mL of cyclohexane was removed by distillation. 1.1 mL of TMEDA and 2.9 mL of sec-butyl lithium (1.3 M in cyclohexane) were mixed and then the dark brown solution was added to the sPS-pMS/cyclohexane solution. The mixed solution was continuously stirred at 550° C. for 20 hours. The round-bottom flask was moved into the glove box, and the reaction mixture was washed with n-pentane repeatedly, filtered, and dried under reduced pressure. 100 mL of n-pentane was added to the residue and the round-bottom flask was removed from the glove box. 8 mL of the purified methyl methacrylate was added to the flask and stirred at room temperature for 5 hours. A large quantity of methanol was added to terminate the reaction. The resulting polymer was precipitated, filtered, collected, and extracted with acetone at room temperature. The soluble and insoluble polymer fractions were separated by centrifuge and dried under reduced pressure to afford 2.2 g of sPS-pMS-g-PMMA (insoluble in acetone) and 0.3 g of homopolymer of methyl methacrylate (soluble in acetone). The $^1$H NMR analysis indicated that the sPS-pMS-g-PMMA contained 10.1 mol % of PMMA.

EXAMPLE 21

Preparation of Syndiotactic Poly(styrene-co-p-methylstyrene)-g-polyisoprene (sPS-pMS-g-polyisoprene)

0.7 g of syndiotactic poly(styrene-co-p-methylstyrene) (sPS-pMS) obtained from Example 6 (containing 15 mol % of syndiotactic polystyrene) was charged in a 300 ml round-bottom flask and dissolved with 150 mL of the purified and dried cyclohexane. Then, 50 mL of cyclohexane was removed by distillation. 2.4 mL of TMEDA and 5 mL of sec-butyl lithium (1.3 M in cyclohexane) were mixed and then the dark brown solution was added to the sPS-pMS/cyclohexane solution. The mixed solution was continuously stirred at 750° C. for 20 hours. The round-bottom flask was moved into the glove box, and the reaction mixture was washed with n-pentane repeatedly, filtered, and dried under reduced pressure. 100 mL of n-pentane was added to the residue and the round-bottom flask was removed from the glove box. 4 g of the purified isoprene was added to the flask and stirred at room temperature for 48 hours. A large quantity of methanol was added to terminate the reaction. The resulting polymer was precipitated, filtered, collected, and extracted with n-pentane at room temperature. The soluble and insoluble polymer fractions were separated by centrifuge and dried under reduced pressure to afford sPS-pMS-g-polyisoprene (insoluble in n-pentane) and a homopolymer of isoprene (soluble in n-pentane). The high temperature gel permeation chromatography (Waters GPC 150CV) showed that the starting polymer (sPS-pMS) had a Mw of 240,600 and PDI of 9.3, and the resulting polymer (sPS-pMS-g-polyisoprene) had a Mw of 556,400 and PDI of 8.1.

EXAMPLE 22

Preparation of Syndiotactic Poly(styrene-co-p-methylstyrene)-g-poly(t-butylmethacrylate) (sPS-pMS-g-PtBMA)

1.0 g of syndiotactic poly(styrene-co-p-methylstyrene) (sPS-pMS) obtained from Example 8 was charged in a 250 ml round-bottom flask and dissolved with 50 mL of the purified and dried cyclohexane. 1.4 mL of TMEDA and 1.1 mL of n-butyl lithium (2.5 M in hexane) were mixed and then the mixed solution was added to the sPS-pMS/cyclohexane solution. The mixed solution was continuously stirred at 60° C. for 4 hours. The round-bottom flask was moved into the glove box, and the reaction mixture was washed with n-pentane repeatedly, filtered, and dried under reduced pressure. 20 mL of n-pentane and 1.0 g of t-butylmethacrylate were added to the residue and the round-bottom flask was removed from the glove box. The mixture was stirred at room temperature for 48 hours. 10 mL of methanol was added to terminate the reaction. The resulting polymer was precipitated, filtered, collected, and extracted with acetone at room temperature. The soluble and insoluble polymer fractions were separated by centrifuge and dried under reduced pressure to afford 1.163 g of sPS-pMS-g-

PtBMA (insoluble in acetone) and 0.158 g of a homopolymer of PtBMA (soluble in acetone). The FT-IR spectrum showed that sPS-pMS-g-PtBMA had absorption of carboxyl group (C=O) at 1725 cm$^{-1}$. The $^1$H NMR analysis indicated that the sPS-pMS-g-PtBMA contained 9.3 mol % of PtBMA.

EXAMPLE 23

Preparation of Syndiotactic Poly(styrene-co-p-methylstyrene)-g-poly(tetrahydrofuran) (sPS-pMS-g-PTHF)

1.0 g of sPS-pMS-Br (containing 2 mol % of bormine) was charged in a 250 ml vessel and dissolved with 15 mL of the purified and dried THF (tetrahydrofuran), then the mixture was cooled to −15° C. to −20° C. In a glove box, 5 mL of THF and 8.76 mg of anhydrous silver tetrafluoroborate (AgBF$_4$) was mixed and was immediately removed from the glove box. The AgBF$_4$ solution was cooled by liquid nitrogen to −30° C. to −40° C. and then sPS-pMS-Br/THF was added. The mixture was stirred at −15° C. to −20° C. for 20 minutes, and then stirred at −3° C. for 24 hours. 3 mL of methanol was added to terminate the reaction. The resulting polymer was precipitated, filtered, collected, and extracted with ethanol at room temperature. The soluble and insoluble polymer fractions were separated by centrifuge and dried under reduced pressure to afford 2.34 g of sPS-pMS-g-PTHF (insoluble in ethanol) and a homopolymer of PTHF (soluble in ethanol). The FT-IR analysis showed that the sPS-pMS-g-PTHF had absorption of ether (—C—O—C—) at 1112 cm$^{-1}$.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A graft copolymer of a syndiotactic styrene/para-alkylstyrene copolymer, having the formula of

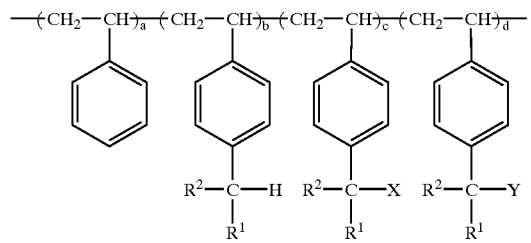

(I)

wherein
 R$^1$ and R$_2$ are independently selected from the group consisting of hydrogen, alkyl, and primary, and secondary haloalkyl,
 X is a functional group selected from a group containing halogen, oxygen, sulfur, silicon, nitrogen, carbon, phosphorus, and mixtures thereof,
 Y is an atactic polymer moiety, a ranges from 10 to 30000,
 b ranges from 0 to 30000,
 c ranges from 0 to 30000, and
 d ranges from 1 to 30000.

2. The graft copolymer as claimed in claim 1, wherein X is a halogen.

3. The graft copolymer as claimed in claim 1, wherein X is an alkali or alkaline earth metal.

4. The graft copolymer as claimed in claim 1, wherein X is selected from the group consisting of alkoxides, phenoxides and carboxylates.

5. The graft copolymer as claimed in claim 1, wherein X is selected from the group consisting of thiolates, thiophenolates, thioethers, thiocarboxylates, dithiocarboxylates, thioureas, dithiocarbamates, xanthates and thiocyanates.

6. The graft copolymer as claimed in claim 1, wherein X is selected from the group consisting of silanes and halosilanes.

7. The graft copolymer as claimed in claim 1, wherein X is selected from the group consisting of malonates, cyanides, and CR$^3_1$ wherein each R$^3$ is an organic radical.

8. The graft copolymer as claimed in claim 1, wherein X is selected from the group consisting of amides, amines, carbazoles, phthalimides, pyridines, maleimides and cyanates.

9. The graft copolymer as claimed in claim 1, wherein X is a phosphine.

10. The graft copolymer as claimed in claim 1, wherein R$^1$ and R$^2$ are independently selected from the group consisting of hydrogen, C$_1$ to C$_5$ alkyl, and C$_1$ to C$_5$ primary and secondary haloalkyl.

11. The graft copolymer as claimed in claim 1, which is obtained from polymerization in the presence of a metallocene as a catalyst.

12. The graft copolymer as claimed in claim 1, wherein said copolymer has a number average molecular weight of at least about 1000.

13. The graft copolymer as claimed in claim 1, wherein Y is selected from the group consisting of polymers and copolymers of anionically polymerizable monomers, cationically polymerizable monomers, anionically and cationically ring-openable monomers, and free radical polymerizable monomers.

14. The graft copolymer as claimed in claim 1, wherein Y is a polymer of anionically polymerizable monomers.

15. The graft copolymer as claimed in claim 14, wherein the anionically polymerizable monomer is selected from the group consisting of conjugated dienes, vinyl aromatic compounds, vinyl unsaturated amides, acenaphthylene, 9-acrylcarbazole, acrylonitrile, methacrylonitrile, organic isocyanates, acrylates, methacrylates, alkyl acrylates, alkyl methacrylates, glycidyl methacrylates, vinyl pyridines, and mixtures thereof.

16. The graft copolymer as claimed in claim 13, wherein the cationically polymerizable monomer is selected from the group consisting of vinyl aromatic compounds, vinyl ethers, N-vinylcarbazole, isobutene, and mixtures thereof.

17. The graft copolymer as claimed in claim 13, wherein the ring-openable monomer is selected from the group consisting of cyclic ethers, sulfides, lactones, lactams, N-carboxyanhydrides, cyclic anhydrides, and mixtures thereof.

18. The graft copolymer as claimed in claim 13, wherein the free radical polymerizable monomer is selected from the group consisting of vinyl aromatic compounds, conjugated dienes, acrylates, methacrylates, alkyl acrylates, alkyl methacrylates, vinyl acetates, and mixtures thereof.

* * * * *